US011198633B2

(12) United States Patent
Weinberger et al.

(10) Patent No.: US 11,198,633 B2
(45) Date of Patent: *Dec. 14, 2021

(54) METHOD AND PLANT FOR PRODUCING HOLLOW MICROSPHERES MADE OF GLASS (71) Applicant: DENNERT PORAVER GMBH, Postbauer-Heng (DE)

(72) Inventors: Karl Weinberger, Bischofsmais (DE); Wolfram Neidhardt, Hilpoltstein (DE)

(73) Assignee: Dennert Poraver GmbH, Postbauer-Heng (DE)

(*) Notice: Subject to any disclaimer, the term of this patent is extended or adjusted under 35 U.S.C. 154(b) by 353 days.

This patent is subject to a terminal disclaimer.

(21) Appl. No.: 16/188,789

(22) Filed: Nov. 13, 2018

(65) Prior Publication Data
US 2019/0077693 A1    Mar. 14, 2019

Related U.S. Application Data (63) Continuation of application No. PCT/EP2017/060961, filed on May 8, 2017.

(30) Foreign Application Priority Data

May 11, 2016   (DE) ..................... 10 2016 208 141.1

(51) Int. Cl.
*C03B 19/10* (2006.01)
*C03C 11/00* (2006.01)
*C03B 19/08* (2006.01)

(52) U.S. Cl.
CPC .......... *C03B 19/1075* (2013.01); *C03B 19/08* (2013.01); *C03C 11/002* (2013.01);
(Continued)

(58) Field of Classification Search
None
See application file for complete search history.

(56) References Cited

U.S. PATENT DOCUMENTS 2,978,340 A   4/1961 Veatch
3,230,064 A   1/1966 Veatch et al.
(Continued)

FOREIGN PATENT DOCUMENTS

CN   104891813 A   9/2015
DE   2156303 A1    10/1972
(Continued)

*Primary Examiner* — Erin Snelting
(74) *Attorney, Agent, or Firm* — Laurence A. Greenberg; Werner H. Stemer; Ralph E. Locher (57) ABSTRACT A process and a plant produce hollow microspheres made of glass. According to the process an aqueous suspension is prepared from starting materials containing glass powder and water glass, feedstock particles having a diameter between 5 μm and 300 μm, in particular between 5 μm and 100 μm, being produced from the suspension. The feedstock particles are mixed with a pulverulent release agent made of aluminum hydroxide in an intensive mixer. The mixture of feedstock particles and release agent is subsequently introduced into a firing chamber of a furnace. The feedstock particles expand in the firing chamber, at a firing temperature which exceeds the softening temperature of the glass powder, to form the hollow microspheres.

13 Claims, 4 Drawing Sheets (52) U.S. Cl.
CPC ........ *C03C 11/007* (2013.01); *C03C 2203/10* (2013.01); *C03C 2203/52* (2013.01); *C03C 2214/04* (2013.01); *C03C 2214/30* (2013.01)

(56) References Cited

U.S. PATENT DOCUMENTS

| | | | | |
|---|---|---|---|---|
| 3,354,024 | A | * | 11/1967 | Eustachio ........... C03B 19/1085 428/406 |
| 3,532,480 | A | * | 10/1970 | Eustachio ............... C03B 19/08 65/20 |
| 5,614,255 | A | | 3/1997 | Kimura et al. |
| 8,637,300 | B2 | | 1/2014 | Ruf et al. |
| 9,018,139 | B2 | | 4/2015 | Tschiersch et al. |
| 2009/0146108 | A1 | * | 6/2009 | Datta ...................... C04B 28/02 252/378 R |
| 2013/0029885 | A1 | * | 1/2013 | Tschiersch .............. C04B 28/02 507/269 |

FOREIGN PATENT DOCUMENTS

| | | |
|---|---|---|
| DE | 4344994 A1 | 7/1995 |
| DE | 102010034083 A1 | 2/2012 |
| EP | 0207668 A1 | 1/1987 |
| EP | 0678482 A2 | 10/1995 |
| EP | 2022768 A2 | 2/2009 |
| WO | 2011086024 A1 | 7/2011 |

* cited by examiner

METHOD AND PLANT FOR PRODUCING HOLLOW MICROSPHERES MADE OF GLASS

CROSS-REFERENCE TO RELATED APPLICATION

This is a continuation application, under 35 U.S.C. § 120, of copending international application No. PCT/EP2017/060961, filed May 8, 2017, which designated the United States; this application also claims the priority, under 35 U.S.C. § 119, of German patent application No. 10 2016 208 141.1, filed May 11, 2016; the prior applications are herewith incorporated by reference in their entirety.

BACKGROUND OF THE INVENTION

Field of the Invention

The invention relates to a method for producing hollow microspheres made of glass. The invention furthermore relates to a plant for carrying out the method.

Hollow microspheres made of glass, i.e. spherical, essentially monocellular expanded particles having a glass wall enclosing a cavity and typical diameters in the submillimeter range (about 1 to 1000 micrometers), are widely used as light aggregates in composite materials and lightweight concrete. Furthermore, these microspheres—also referred to as glass microspheres—are used inter alia in medicine and the consumer goods industry.

A method for producing such hollow microspheres is known, for example, from U.S. Pat. No. 3,230,064 A. According thereto a vertical kiln (also referred to as a "shaft kiln" below), in the firing chamber of which an upwardly directed hot gas flow is generated by means of a burner, is provided for producing the hollow microspheres. A firing material, which consists of microparticles to which a blowing agent is added, is introduced into the firing chamber of this vertical kiln. The microparticles are melted in the hot gas flow. Furthermore, gas is generated by the blowing agent in the melted microparticles, and the microparticles are blown (expanded) by this gas in order to form the desired hollow microspheres. Because of their reduced density, the hollow microspheres float in the gas flow and are extracted from the firing chamber together with the gas flow through a gas outlet arranged at the upper end of the vertical kiln. The extracted hollow microspheres are separated from the gas flow in a cyclone separator arranged downstream of the vertical kiln or a bag filter.

One major problem to be dealt with in the production of hollow microspheres is the adhesion susceptibility of the particles partially or fully melted during the firing process, which leads on the one hand to agglomeration (caking) of the particles to one another, and on the other hand to adhesion of the particles to the inner wall of the kiln. This problem is in general commensurately more difficult to overcome when the firing temperatures are higher and the particle sizes of the expanded particles are smaller.

In order to avoid adhesion of the particles to one another and to the kiln wall, a release agent is often admixed to the firing material. At present, above all kaolin and metakaolin, limestone powder, talc or corundum are used as a release agent for the production of hollow microspheres. Extremely fine-grained particles, such as the hollow microspheres to be produced, are however strongly susceptible to agglomeration despite the use of these release agents, so that relatively high outlay must be expended in order to separate the resulting hollow microspheres from one another and from the release agent.

U.S. Pat. No. 5,614,255 A discloses in principle the effect of aluminum hydroxide as a release agent in the production of hollow microspheres made of glass.

Published, non-prosecuted German patent application DE 43 44 994 A1 furthermore discloses the use of an intensive mixer in the form of an Eirich counterflow rapid mixer for mixing of a batch of glass powder, water glass, clay powder, polysaccharide and water to be granulated during the production of expanded glass granulate.

SUMMARY OF THE INVENTION

The object of the invention is to provide an effective method and effectively operable plant for producing hollow microspheres made of glass.

In relation to the method, the object is achieved according to the invention by the features of independent method claim. In relation to the plant, the object is achieved according to the invention by the features of the independent plant claim.

According to the method, for producing hollow microspheres made of glass, an aqueous suspension of starting substances, containing glass powder and water glass, is prepared, which is referred to below as the "starting suspension". Optionally, an expansion agent ("blowing agent") is added to the starting suspension. Firing material particles ("green particles"), the diameters of which lie between 5 micrometers and 300 micrometers, in particular between 5 micrometers and 100 micrometers, are produced from the starting suspension.

According to the invention, the firing material particles are mixed with a powdered release agent made of aluminum hydroxide in an intensive mixer, before the mixture of firing material particles and release agent is introduced into a firing chamber of a kiln. An intensive mixer refers to a mixer in which the mixing process is carried out with a power input of at least about 2 kilowatts per 100 kilograms of mixing material, or the mixing tool of which is moved with a circumferential speed of at least 15 meters per second during the mixing process. Preferably, the intensive mixer used according to the invention has a power input of at least 5 kilowatts per 100 kilograms of mixing material, in particular at least 10 kilowatts per 100 kilograms. The circumferential speed of the mixing tool of the intensive mixer used according to the invention is preferably at least 30 meters per second.

In the firing chamber, in which a firing temperature which exceeds the softening temperature of the glass powder prevails, the firing material particles finally expand to form the hollow microspheres. In a typical version of the method, the firing material particles are in this case enlarged or expanded (blown) by up to 25% to 70% in relation to their diameter, larger suspension factors typically being obtained with larger firing material particles. The diameter of the hollow microspheres resulting from the expansion process ("blowing process") is therefore with typical dimension between about 7 and 500 micrometers.

The release agent used according to the invention preferably consists of aluminum hydroxide with a purity of at least 95 mass %, in particular more than 99.5 mass %. In other words, the proportion of other substances (impurities) in the release agent is less than 5 mass %, preferably less than 0.5 mass %. In one preferred embodiment, the powdered release agent made of aluminum hydroxide is furthermore present with a fineness of $D_{90} \leq 35$ μm (micrometers), in particular $D_{90} \leq 5$ μm, preferably $D_{90} \leq 3.5$ μm. This means that 90% of the powder particles have a diameter which is less than or equal to 35 μm, in particular less than or equal to 5 μm, preferably less than or equal to 3.5 μm. As the release agent, the commercially available flame retardant Apyral 40CD from the company Nabaltec, which satisfies the above specifications of purity and fineness, is for example used.

Surprisingly, it has been found in experiments that by the above-described method, i.e. when using aluminum hydroxide as a release agent and with intensive mixing of the release agent with the firing material particles before the firing process, a substantially improved release effect can be achieved during the production of hollow glass microspheres in comparison with conventional methods. In this case, it has been shown in particular that the improved release effect is selective for the use of aluminum hydroxide in combination with the intensive mixing. With other release agents, or without the intensive mixing, this improved release effect is not observed, or is observed only to a substantially lesser extent. One substantial advantage of the method is furthermore that only relatively little release agent is required because of the intensive mixing. Furthermore, it has surprisingly been found that the use of aluminum hydroxide as a release agent promotes the formation of hollow microspheres.

In one typical version, the hollow microspheres produced by the method according to the invention have a central spherical cavity, which is enclosed by a hollow sphere wall. The hollow microspheres produced according to the method typically have a rough surface. The rough surface is in this case in particular advantageous for use of the hollow microspheres as a light aggregate in a composite material, since in this way particularly strong binding is achieved between the hollow microspheres and the surrounding matrix material. Furthermore—particularly in the case of larger hollow microspheres—a multiplicity of bubbles are often incorporated in the hollow sphere wall, the diameter of which bubbles is less however than the diameter of the central hollow volume by a multiple (in particular by at least a factor of 10).

One particular advantage of the use of aluminum hydroxide as a release agent and the intensive mixing of the release agent with the firing material is that in this way the production of the hollow microspheres in a rotary kiln is controllable in terms of process technology, since the adhesion susceptibility of the particles, which typically occurs particularly strongly in this case during the firing process, is effectively counteracted. Correspondingly, in one preferred embodiment of the method, a rotary kiln is used for the expansion process. The rotary kiln is, in particular, a rotary kiln heated indirectly (i.e. from the outside) by flame impingement. The supply of heat into the firing chamber of the rotary kiln in this case therefore takes place from the outside through the lateral surface of the rotary tube. The firing temperature in the firing chamber of the rotary kiln is in this method variant, with expedient dimensioning, set to a value of between 700° C. and 1150° C.

In an alternative embodiment, the expansion process is carried out in a shaft kiln (vertical kiln), in which a hot gas flow, in which the expansion process takes place, is guided in an elongate firing chamber which is oriented approximately vertically in its longitudinal extent. In this embodiment of the method, the firing temperature in the firing chamber is preferably between 700° C. and 1400° C.

The production of the firing material particles is preferably carried out by spray drying of the starting suspension since in this case a particularly narrow grain size distribution (particle size distribution) is advantageously achieved with a particularly high quality in terms of the sphericity of the firing material particles. In particular, the production of firing material particles with the desired extremely small diameters of between 5 micrometers and 100 micrometers can advantageously be carried out well in this case. As an alternative, the firing material particles are produced by granulation by means of a granulator plate and subsequent drying. As a further alternative, the starting suspension is compacted to form a pregranulate, which is dried and broken down to form the firing material particles with the desired size.

Expediently, the glass powder which is used for producing the starting suspension is ground to a fineness of $D_{97} \leq 47$ μm. This means that 97% of the ground glass particles have a diameter which is less than or equal to 47 μm. In order to produce the particularly small firing material particles (for example for firing material particles smaller than 50 μm) particularly fine glass powder with a $D_{97}$ value of 35 μm is preferably used. The glass powder used is in this case respectively present with a particular particle size distribution, so that the firing material particles produced from the glass powder are subject to a size distribution.

Preferably, the batch of firing material particles and release agent is mixed intensively for a mixing time of from 10 seconds to 10 minutes, in particular for about 5 minutes, before introduction into the firing chamber.

An advantageous mixing ratio of release agent and firing material particles is with a proportion of from 5% to 25%, in particular 17%, by mass of release agent, expressed in terms of the total mass of the mixture.

In one preferred embodiment, an Eirich intensive mixer is used for mixing the firing material particles with the release agent. An Eirich intensive mixer contains an obliquely standing rotating mixing container, in which an eccentrically arranged stirrer stirs the mixing material counter to the rotation direction of the stirring container, so that a particularly high mixing quality is achieved. In principle, however, in the scope of the invention it is also possible to carry out the method with a "recumbent" Lödige plowshare mixer, or with an Ekato mixer characterized by a conical mixing container.

A plant according to the invention for producing hollow microspheres made of glass comprises a kiln having a firing chamber. The plant furthermore contains an intensive mixer, preferably an Eirich intensive mixer. The intensive mixer is configured for mixing a powdered release agent made of aluminum hydroxide with firing material particles, which are produced from an aqueous suspension of starting substances, comprising glass powder and water glass, and optionally a blowing agent, the firing material particles having diameters which lie between 5 micrometers and 300 micrometers, in particular between 5 micrometers and 100 micrometers. To this end, the plant preferably contains feed lines, via which the above-mentioned components (i.e. the release agent and the firing material particles) are added to the intensive mixer. The release agent and the firing material particles are for example fed separately from one another to the intensive mixer. As an alternative to this, a mixing trough, via which a premix of firing material particles and release agent is fed to the intensive mixer, is provided as the feed line.

Lastly, the plant contains a charging device, by means of which the firing chamber of the kiln can be charged with the mixture of firing material particles and release agent, a firing temperature which exceeds the softening temperature of the glass powder, and at which the firing material particles expand to form the hollow microspheres, being generatable in the firing chamber.

The kiln of the plant is preferably formed by a rotary kiln, the firing chamber of which is in particular heated indirectly. In an alternative embodiment, the kiln of the plant is formed by a shaft kiln.

Other features which are considered as characteristic for the invention are set forth in the appended claims.

Although the invention is illustrated and described herein as embodied in a method and a plant for producing hollow microspheres made of glass, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and structures which correspond to one another are always provided with the same references in all the figures.

Figure 1:
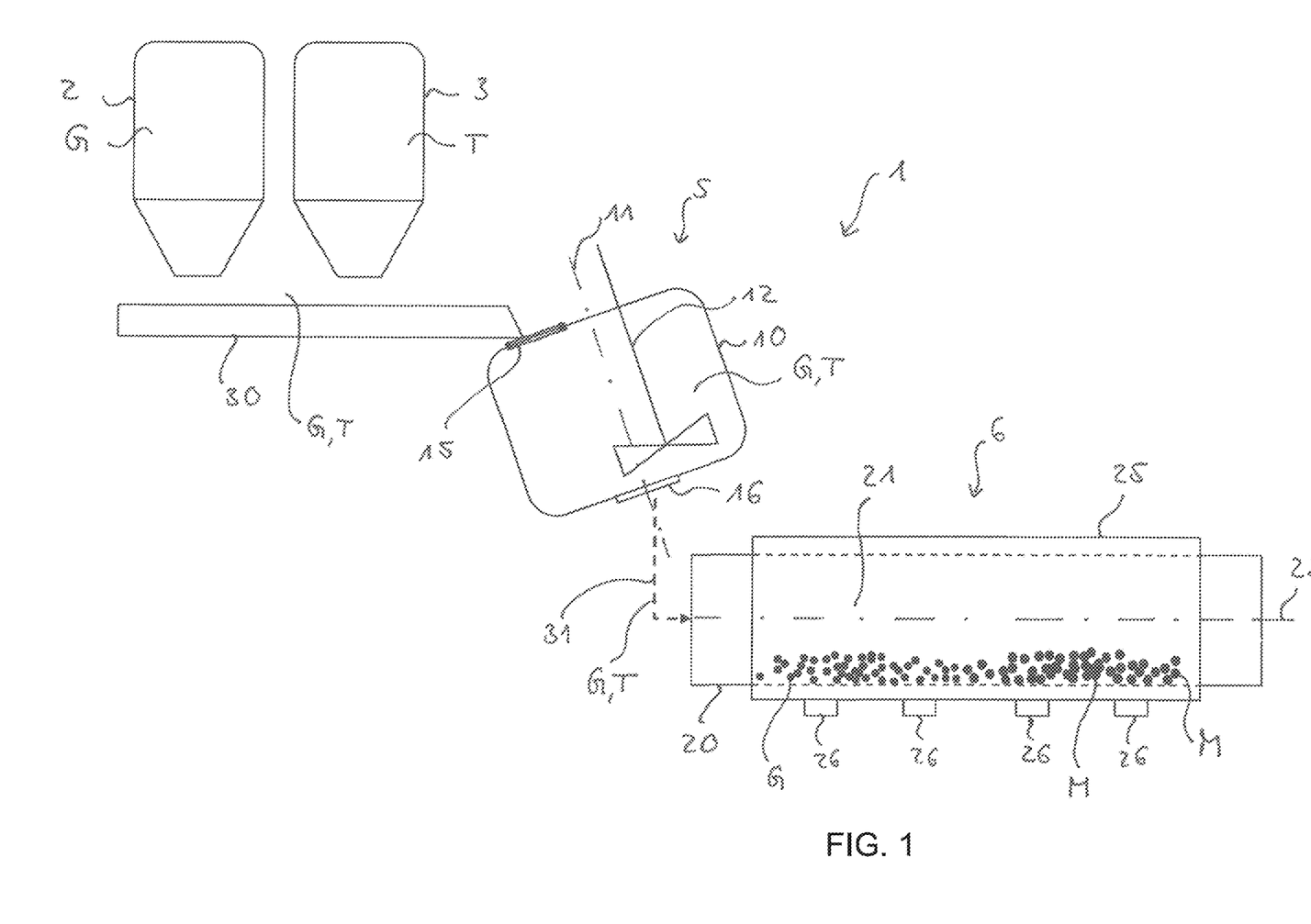
FIG. 1 is a schematically simplified representation of a plant for producing hollow microspheres made of glass, having an intensive mixer for mixing firing material particles with a powdered release agent made of aluminum hydroxide, and having a firing kiln configured as a rotary kiln, into which the mixture of firing material particles and release agent is introduced, so that the firing material particles are expanded to form the desired hollow microspheres.

Referring now to the figures of the drawings in detail and first, particularly to FIG. 1 thereof, there is shown a plant 1 for producing hollow microspheres M made of glass, i.e. for producing hollow glass spheres, the typical diameters of which lie in a range of between 7 and 500 micrometers.

The plant 1 contains a first silo 2 as a storage container for firing material particles G, and a second silo 3 has a storage container for powdered release agent T made of aluminum hydroxide ($Al(OH)_3$). The plant 1 furthermore contains an intensive mixer 5 for mixing the firing material particles G with the release agent T, as well as a firing kiln configured as a rotary kiln 6 for expansion of the firing material particles G to form the desired hollow microspheres M.

The firing material particles G stored in the first silo 2 are approximately spherical particles, the diameters of which lie in the range of between 5 micrometers and 300 micrometers. The firing material particles G are in this case produced by a spray-drying process. To this end, (recycled) glass powder, water glass and a blowing agent as starting substances are prepared with water to form a suspension (slurry).

In order to produce a lower fraction of the firing material particles G (i.e. to produce firing material particles G with diameters which tend to be smaller) in tests a particularly fine glass powder was used for the preparation, which is present for example with a particle size distribution that is characterized by the following D values: $D_{10}=2.274$ µm, $D_{50}=9.342$ µm, $D_{90}=24.13$ µm and $D_{97}=34.95$ µm, respectively 10, 50, 90 and 97% by volume of the particles having a diameter for each D value which is less than or equal to the value respectively indicated. A glass powder used experimentally in order to produce an upper fraction of the firing material particles G (to produce firing material particles G which tend to be larger) was characterized by the following D values: $D_{10}=3.195$ µm, $D_{50}=14.44$ µm, $D_{90}=35.63$ µm and $D_{97}=46.60$ µm. The particle size distributions above were determined by measuring a random sample of the respective glass powder with a particle size analyzer from the company Beckman Coulter.

The suspension is particulated and dried in a spray tower to form the firing material particles G with the desired diameters. Optionally, classification is carried out after the spraying process, the fraction with the desired diameters being selected and fed to the silo 2. The firing material particles G may, however, be produced in a different way, for instance with the aid of a granulator plate and subsequent drying of the granulate, or with the aid of a compacting device, the resulting granulate being broken down to the desired size after drying. A subsequent classification step is typically also provided in the alternative embodiments.

The release agent T stored in the second silo 3 is for example the powdered product Apyral 40CD from the company Nabaltec, which is marketed as a flame retardant. The release agent T is distinguished by an aluminum hydroxide content of 99.5%. The particle size distribution of the powder is characterized by the values $D_{10}=0.6$ micrometers, $D_{50}=1.3$ micrometers and $D_{90}=3.2$ micrometers.

The intensive mixer 5 is configured as an Eirich intensive mixer. The intensive mixer 5 contains an essentially cup-shaped mixing container 10, which is mounted rotatably about its longitudinal axis 11, which stands obliquely to the vertical. A mixing tool 12, rotatable counter to the mixing container 10, is arranged parallel to the longitudinal axis 11, eccentrically in the mixing container 10. The mixing container 10 can be charged through a closable top opening 15, and can be emptied through a likewise closable centrally arranged bottom opening 16. For example, an Eirich intensive mixer is used which has a power input of from 10 to 20 kilowatts per 100 kg of mixing material (preferably about 15 kilowatts per 100 kg of mixing material) and a circumferential speed at the outermost point of the stirring tool of at least 30 meters per second.

In the conventional way, the rotary kiln 6 contains an elongated hollow-cylindrical rotary tube 20 made of refractory steel, in the interior of which a firing chamber 21 is formed. The rotary tube 20 is mounted rotatably about its longitudinal axis 23, which is arranged slightly inclined relative to the horizontal. The rotary tube 6 is for the most part housed by a stationary enclosure 25, so that an annular gap is formed between the rotary tube 20 and the enclosure 25. The annular gap is fired by means of a plurality of gas-operated burners 26 which are arranged distributed over the length of the rotary tube 20, so that the firing chamber 21 is heated indirectly via the lateral surface of the rotary tube 20.

During operation of the plant 1, firing material particles G and release agent T are dosed from the two silos 2, 3 to a mixing trough 30 arranged below the silos 2, 3, so that in the latter there is a premix of firing material particles G and release agent T with a release agent proportion of 10 mass %. The adjustment of the desired mass ratio may, for example, be carried out by means of a balance, although it is also possible for the adjustment to be carried out volumetrically, for example by means of rotary valves or conveying screws assigned to the silos 2, 3. Through the mixing trough 30, the premix of firing material particles G and release agent T is conveyed into the mixing container 10 of the intensive mixer 5.

As an alternative to the exemplary representation, the mixing trough 30 may also be omitted, in which case firing material particles G and release agent T are respectively dosed separately into the intensive mixer 5, so that the desired mixing ratio is produced therein.

The mixing process is carried out batchwise, a batch of the premix respectively being subjected to a mixing process. The premix of the release agent T and firing material particles G is homogenized for a mixing time of 5 minutes in the intensive mixer 5. After the end of the mixing process, the mixture of firing material particles G and release agent T is extracted from the mixing container 10 through the bottom opening 16. The mixture is stored in a buffer container (not explicitly represented) connected between the intensive mixer 5 and the rotary kiln 6.

From the buffer container, the mixture of firing material particles G and release agent T is fed continuously to a charging device (not explicitly represented here) of the firing chamber 21 of the rotary kiln 6 (this is indicated by an arrow 31). In the firing chamber 21, during operation of the plant 1, a firing temperature which exceeds the softening temperature of the glass powder, and is for example 960° C.) is generated by means of the burners 26, at which temperature the firing material particles G expand successively to form the desired hollow microspheres M in a period of time from about 4 to 10 minutes. The hollow microspheres M are extracted from the firing chamber 21 and, after a cooling and sorting step, fed to a product reservoir (not represented here). The release agent T is separated from the hollow microspheres M by screening or air separation. The release agent oxidized during the firing process to form aluminum oxide ($Al_2O_3$, corundum) is optionally partially reused, in which case the release agent may then in particular be admixed to the firing material particles G in the conventional way at the start of the firing process. Furthermore, the hollow microspheres M, again by screening or air separation, are separated from multicellularly (in foam fashion) expanded particles (i.e. particles having a plurality of cavities) which occur in a small extent besides the hollow microspheres M during the firing process. These multicellularly expanded particles are either disposed of as rejects or delivered for a different use.

Figure 2:
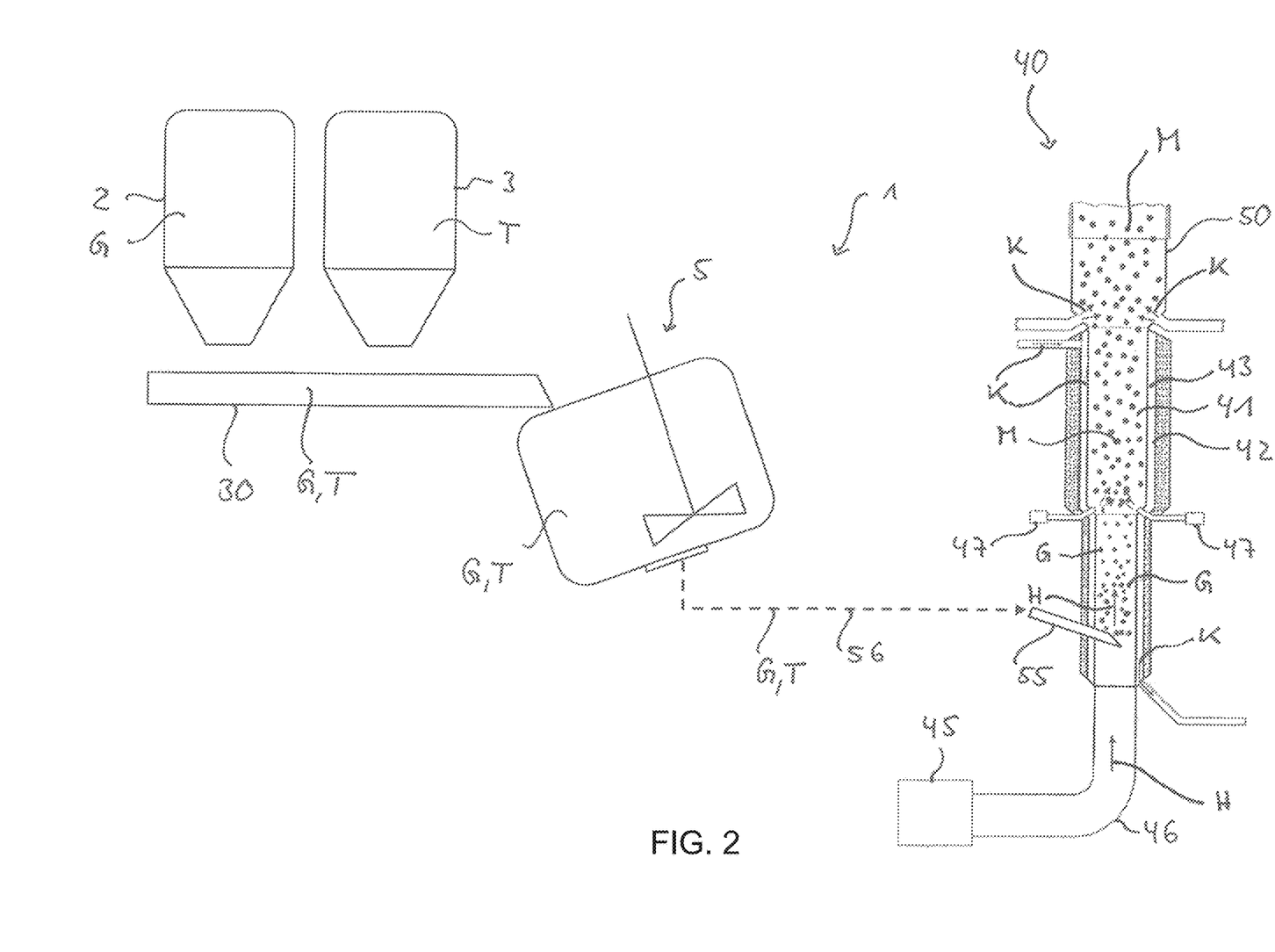
FIG. 2 is an illustration according to FIG. 1 of an alternative embodiment of the plant, in which the firing kiln is configured as a shaft kiln.

FIG. 2 shows an alternative embodiment of the plant 1. In contrast to the first embodiment, in this case the expansion process is carried out in a shaft kiln 40 rather than in a rotary kiln.

The shaft kiln 40 comprises a shaft-like, elongated firing chamber 41 oriented vertically in terms of its longitudinal extent, which is enclosed by a double wall 42 made of steel, which is thermally insulated outward. Cooling air K is guided in a cooling gap 43 formed by the double wall 42. The firing chamber 41 is widened in stages upward.

The shaft kiln 40 is assigned a gas-operated burner 45, which is used to generate a hot gas flow H directed from the bottom upward in the firing chamber 41. To this end, the hot gas generated by the burner 45 is fed through a hot gas line 46 to the firing chamber 41 as the hot gas flow H. Approximately halfway up the firing chamber 41, i.e. in the region of the above-described cross-sectional widening, a number of (for example six) additional gas-operated burners 47 are arranged, which are positioned distributed in the manner of a ring around the circumference of the firing chamber 41.

Above the firing chamber 41, according to FIG. 2 there follows a region which is used as a cooling trap 50 and has a further widened cross section relative to the cross section of the upper section of the firing chamber 41. As an alternative, the firing chamber 41 and the optionally provided cooling trap 50 can be configured with a uniform cross section over their entire height.

Lastly, the shaft kiln 40 contains a charging device, which is formed here by a firing material line 55. The firing material line 55 is fed through the double wall 42 and opens into the lower section of the firing chamber 41. The firing material line 55 is fed from the buffer container downstream of the intensive mixer 5 (this is indicated by the arrow 56). The firing material line 55 extends, in particular, sloping downward in the charging direction, so that the firing material slides into the firing chamber 41 without active conveying (merely under the effect of the force of gravity). Optionally, however, the charging device may also comprise means for actively conveying the firing material, for example a compressed-air system or a conveying screw.

During operation of the plant 1, in the present exemplary embodiment the homogeneous mixture of firing material particles G and release agent T are conveyed continuously by means of the firing material line 55 into the firing chamber 41, where they are collected and carried upward by the hot gas flow H.

In this case, a temperature of for example 650° C., to which the firing material particles G, initially preheated, is generated in the lower section of the firing chamber 41. The firing chamber 41 is additionally heated by the burners 47, so that the temperature in the upper section of the firing chamber 41 is increased to the firing temperature which exceeds the softening temperature of the glass powder. The expansion of the firing material particles G to form the hollow microspheres M takes place in brief flame contact at about 1400° C. in this case.

The expanded hollow microspheres M are lastly fed to the cooling trap 50, and quenched there by supply of cooling air K. Lastly, the hollow microspheres M are separated from the hot gas flow by a solids separator, and fed optionally after a sorting step to a product reservoir (again not represented here). The jointly extracted release agent T and any rejects (in particular multicellularly expanded particles) are in turn separated from the hollow microspheres M by means of a cyclone.

Tests have revealed that the release effect substantially improved in comparison with conventional methods is attributable both to the use of aluminum hydroxide as the release agent T and to the intensive mixing of the firing material particles G with the release agent T, and in particular is achieved only by the combination of both method features.

Figure 3:
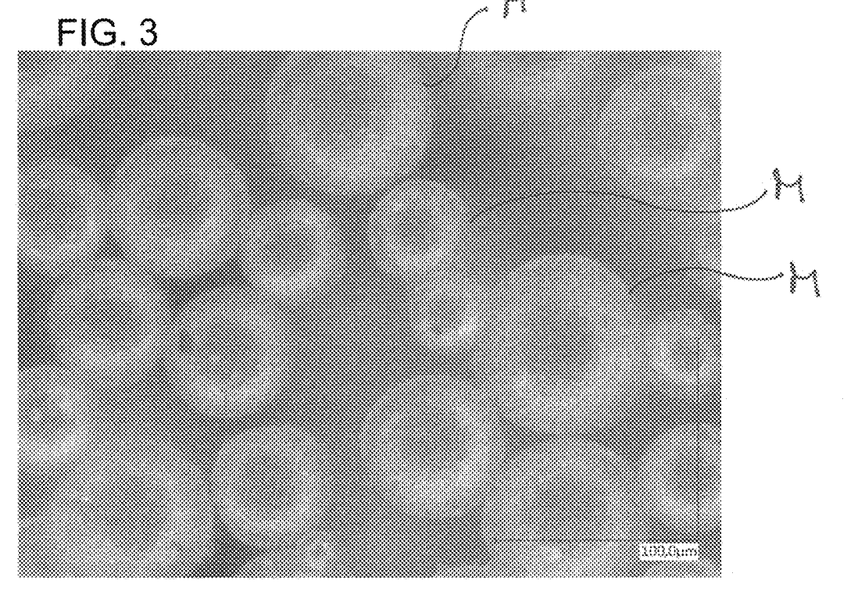
FIGS. 3-5 are microscopy images of hollow microspheres which are produced by the method according to the invention.
Figure 4:
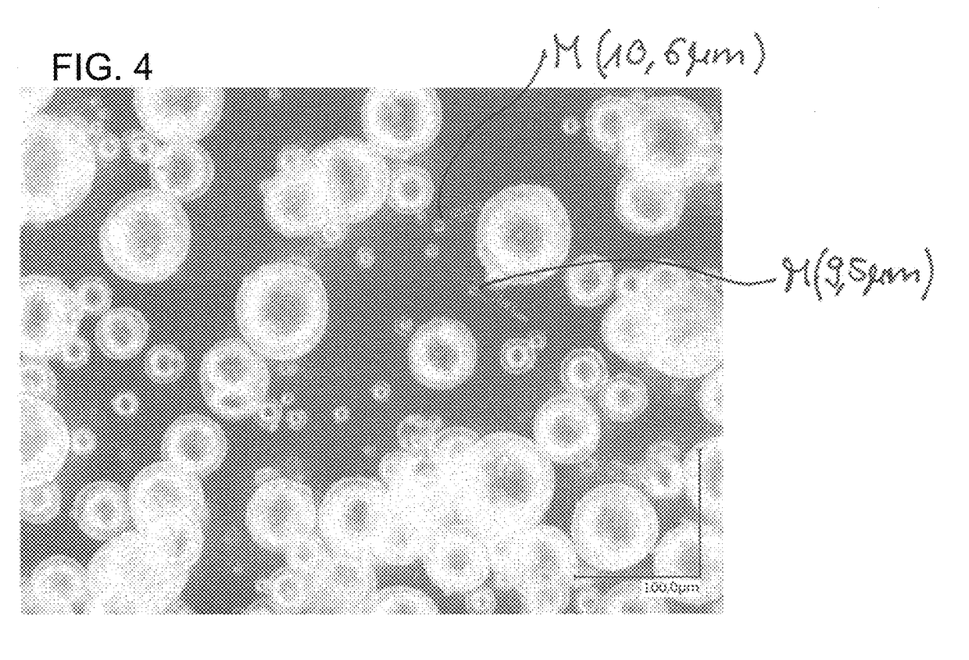
Figure 5:
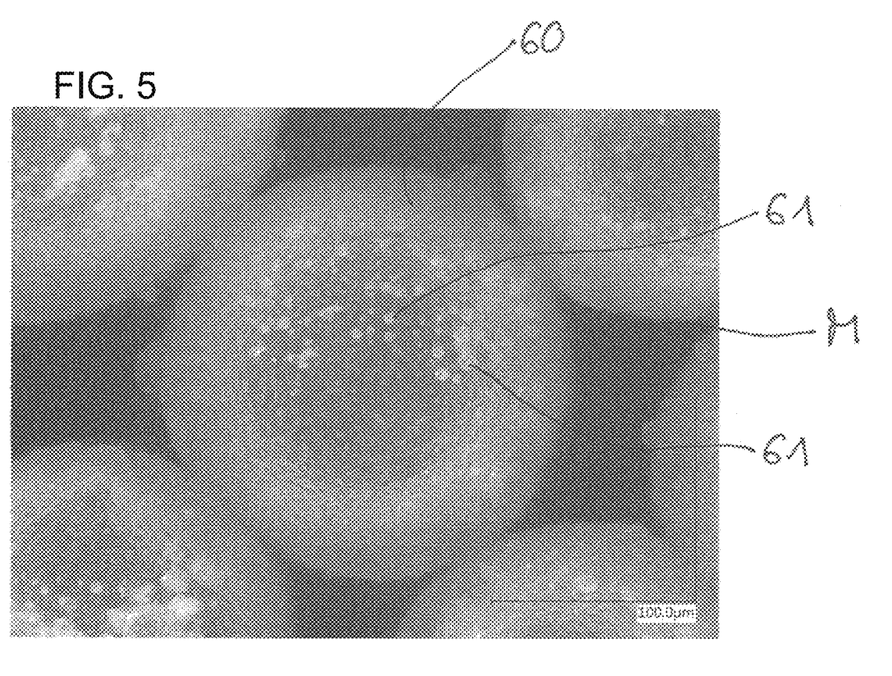

FIGS. 3 to 5 respectively represent microscopy images of hollow microspheres M produced according to the invention at different magnifications. The respective magnification can be seen from the scale respectively indicated on the bottom right in the figure. These hollow microspheres M were produced in a plant 1 according to FIG. 1, an Eirich intensive mixer on an industrial scale being used as the intensive mixer 5. The mixing process was in this case carried out for 5 minutes with a maximum stirrer speed of about 31.4 meters per second—here, the circumferential speed of the mixing tool 12 at its greatest diameter is indicated—with a counter-rotational speed of the mixing container 10 of 35 revolutions per minute. The mixer in this case had a power input of 2.4 kilowatts for 10 liters of mixing material.

FIG. 3 and FIG. 4 show in particular the outstanding sphericity of the hollow microspheres M. It can furthermore be seen from FIG. 3 and FIG. 4 that the expanded particles produced by the proposed method are almost exclusively present as hollow spheres, i.e. in the form of spheres in which an individual central cavity is enclosed by a relatively thin wall. Virtually no multicellular particles, which have a plurality of cavities of comparable size in their core, are produced. It can in this case be seen from FIG. 4 that even the smallest particles are present as hollow spheres, which is shown below by way of example by two dimensioned hollow microspheres M with diameters of 10.6 µm and 9.5 µm, respectively. On the other hand, large hollow microspheres with diameters of between 300 and 500 micrometers were also produced by the method described above.

FIG. 5 shows the relatively rough surface of the hollow sphere wall 60, which is typical of hollow microspheres M produced according to the invention. Furthermore, the bubbles 61 incorporated in the hollow sphere wall 60, or bubbles 61 attached to the hollow sphere wall 60, can be seen, the diameters of which are less by a multiple than the diameter of the central cavity.

The invention is made particularly clear with the aid of the exemplary embodiments described above, but equally is not restricted to them. Rather, further configurational forms of the invention may be derived from the claims and the description above.

The following is a summary list of reference numerals and the corresponding structure used in the above description of the invention:

1 plant
2 silo
3 silo
5 intensive mixer
6 rotary kiln
10 mixing container
11 longitudinal axis
12 mixing tool
15 top opening
16 bottom opening
20 rotary tube
21 firing chamber
23 longitudinal axis
25 enclosure
26 burner
30 mixing trough
31 arrow
40 shaft kiln
41 firing chamber
42 double wall
43 cooling gap
45 burner
46 hot gas line
47 burner
50 cooling trap
55 firing material line
56 arrow
60 hollow sphere wall
61 bubble
G firing material particles
H hot gas flow
K cooling air
M hollow microspheres
T release agent

The invention claimed is:

1. A method for producing hollow microspheres made of glass, which comprises the steps of:
    preparing an aqueous suspension of starting substances containing glass powder and water glass;
    producing firing material particles having diameters lying between 5 micrometers and 300 micrometers from the aqueous suspension of starting substances;
    mixing the firing material particles with a powdered release agent made of aluminum hydroxide in an intensive mixer; and
    introducing a mixture of the firing material particles and the powdered release agent into a firing chamber of a kiln, the firing material particles expanding to form the hollow microspheres in the firing chamber at a firing temperature which exceeds a softening temperature of the glass powder.

2. The method according to claim 1, wherein the glass powder which is used for production of the aqueous suspension of starting substances is ground to a fineness of $D_{97} \leq 47$ µm.

3. The method according to claim 1, wherein the powdered release agent made of the aluminum hydroxide is present with a fineness of $D_{90} \leq 35$ µm.

4. The method according to claim 1, wherein a batch of the firing material particles and the powdered release agent is mixed intensively for a mixing time of from 10 seconds to 10 minutes.

5. The method according to claim 4, which further comprises producing the batch of the firing material particles and the powdered release agent with a release agent proportion of from 5 mass % to 25 mass %.

6. The method according to claim 4, which further comprises producing the batch of the firing material particles and the powdered release agent with a release agent proportion of 17 mass %.

7. The method according to claim 1, which further comprises using an Eirich intensive mixer for mixing the firing material particles with the powdered release agent.

8. The method according to claim 1, which further comprises carrying out the expanding in a rotary kiln.

9. The method according to claim 1, which further comprises carrying out the expanding in a shaft kiln.

10. The method according to claim 1, wherein the diameters lie between 5 micrometers and 100 micrometers.

11. The method according to claim 1, wherein the glass powder which is used for production of the aqueous suspension of starting substances is ground to a fineness of $D_{97} \leq 35$.

12. The method according to claim 1, wherein the powdered release agent made of aluminum hydroxide is present with a fineness of $D_{90} \leq 5$ µm.

13. The method according to claim 1, wherein a batch of the firing material particles and the powdered release agent is mixed intensively for a mixing time of about 5 minutes.

* * * * *